US00RE47944E

(19) United States
(12) Reissued Patent
Holsen

(10) Patent Number: US RE47,944 E
(45) Date of Reissued Patent: Apr. 14, 2020

(54) ACTIVE STYLUS WITH FRACTIONAL CLOCK-CYCLE TIMING

(71) Applicant: Wacom Co., Ltd., Saitama (JP)

(72) Inventor: Eivind Holsen, Trondheim (NO)

(73) Assignee: Wacom Co., Ltd., Saitama (JP)

(21) Appl. No.: 16/175,438

(22) Filed: Oct. 30, 2018

Related U.S. Patent Documents

Reissue of:
(64) Patent No.: 9,483,129
Issued: Nov. 1, 2016
Appl. No.: 14/709,755
Filed: May 12, 2015

(51) Int. Cl.

| | |
|---|---|
| ***G06F 3/0354*** | (2013.01) |
| ***G06F 3/0488*** | (2013.01) |
| ***G06F 3/044*** | (2006.01) |
| ***G06F 3/038*** | (2013.01) |
| ***G06F 3/041*** | (2006.01) |

(52) U.S. Cl.
CPC ..... *G06F 3/03545* (2013.01); *G06F 3/0383* (2013.01); *G06F 3/0416* (2013.01); *G06F 3/0488* (2013.01); *G06F 3/044* (2013.01)

(58) Field of Classification Search
CPC ..... G06F 3/03545; G06F 3/0488
See application file for complete search history.

(56) References Cited

U.S. PATENT DOCUMENTS 6,453,181 B1 9/2002 Challa
6,735,454 B1 5/2004 Yu
6,820,225 B1 * 11/2004 Johnson ..... H04L 43/50 324/76.11
7,663,607 B2 2/2010 Hotelling
7,864,503 B2 1/2011 Chang
7,875,814 B2 1/2011 Chen
7,920,129 B2 4/2011 Hotelling
(Continued)

FOREIGN PATENT DOCUMENTS

WO 2012/129247 A2 9/2012
WO WO 2012/129247 A2 9/2012

OTHER PUBLICATIONS

Lynch, "Electronic Devices with Convex Displays," U.S. Appl. No. 61/454,950, filed Mar. 21, 2011, 36 pages.
(Continued)

*Primary Examiner* — Angela M Lie
(74) *Attorney, Agent, or Firm* — Seed IP Law Group LLP

(57) ABSTRACT

In one embodiment, a method performed by an active stylus includes wirelessly receiving a synchronization signal from a touch controller. The method also includes determining a synchronization parameter of the synchronization signal, the synchronization parameter including an integer part and a fractional part, the integer part representing a positive integer multiple of an active-stylus clock period and the fractional part representing a fractional portion of the active-stylus clock period. The method further includes wirelessly transmitting information for reception by the touch controller, where the information includes a series of data portions, a successive data portion in the series being separated from a preceding data portion by a time interval. The time interval is based at least in part on the active-stylus clock period, the integer part of the synchronization parameter, and an updated fractional error value.

30 Claims, 9 Drawing Sheets

(56) References Cited

U.S. PATENT DOCUMENTS

| | | | | |
|---|---|---|---|---|
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 8,217,902 | B2 | 7/2012 | Chang | |
| 8,432,199 | B2 * | 4/2013 | Lee | H03L 7/0802 327/147 |
| 8,723,824 | B2 | 5/2014 | Myers | |
| 8,745,430 | B2 | 6/2014 | Cornelius | |
| 8,797,301 | B2 | 8/2014 | Ryshtun | |
| 8,878,823 | B1 * | 11/2014 | Kremin | G06F 3/03545 178/18.06 |
| 2006/0030285 | A1 * | 2/2006 | Ghazali | H03L 7/081 455/260 |
| 2008/0309635 | A1 | 12/2008 | Matsuo | |
| 2009/0315854 | A1 | 12/2009 | Matsuo | |
| 2010/0053113 | A1 * | 3/2010 | Wu | G06F 3/044 345/174 |
| 2012/0068964 | A1 * | 3/2012 | Wright | G06F 3/03545 345/174 |
| 2012/0105362 | A1 * | 5/2012 | Kremin | G06F 3/03545 345/174 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |
| 2013/0076612 | A1 | 3/2013 | Myers | |
| 2013/0207926 | A1 | 8/2013 | Kremin | |
| 2014/0049478 | A1 | 2/2014 | Brunet | |
| 2014/0354555 | A1 | 12/2014 | Shahparnia | |
| 2015/0054776 | A1 | 2/2015 | Reitan | |
| 2015/0324029 | A1 * | 11/2015 | Bakken | G06F 3/044 345/174 |

OTHER PUBLICATIONS

Myers et al., "Electronic Devices With Concave Displays," U.S. Appl. No. 61/454,936, filed Mar. 21, 2011, 31 pages.
Rothkopf et al., "Electronic Devices With Flexible Displays," U.S. Appl. No. 61/454,894, filed Mar. 21, 2011, 49 pages.
U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

| Edge Count | 0 | 1 | 2 | 3 | 4 | 5 | 6 | 7 | 8 | ... | 31 | 32 |
|---|---|---|---|---|---|---|---|---|---|---|---|---|
| Clock-Cycle Count | 0 | 27 | 54 | 82 | 109 | 138 | 164 | 190 | 218 | ... | 845 | 873 |

| Iteration | Number of Clock Cycles | Overflow | Fractional Error | Cumulative Error |
|---|---|---|---|---|
| 0 | -- | -- | 0 | 0 |
| 1 | 27 | 0 | 0.28 | 0.28 |
| 2 | 27 | 0 | 0.56 | 0.56 |
| 3 | 27 | 0 | 0.84 | 0.84 |
| 4 | 28 | 1 | 1.12 | 0.12 |
| 5 | 27 | 0 | 0.40 | 0.40 |
| 6 | 27 | 0 | 0.68 | 0.68 |
| 7 | 27 | 0 | 0.96 | 0.96 |
| 8 | 28 | 1 | 1.24 | 0.24 |
| 9 | 27 | 0 | 0.52 | 0.52 |

ACTIVE STYLUS WITH FRACTIONAL CLOCK-CYCLE TIMING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This disclosure generally relates to touch sensors and active styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
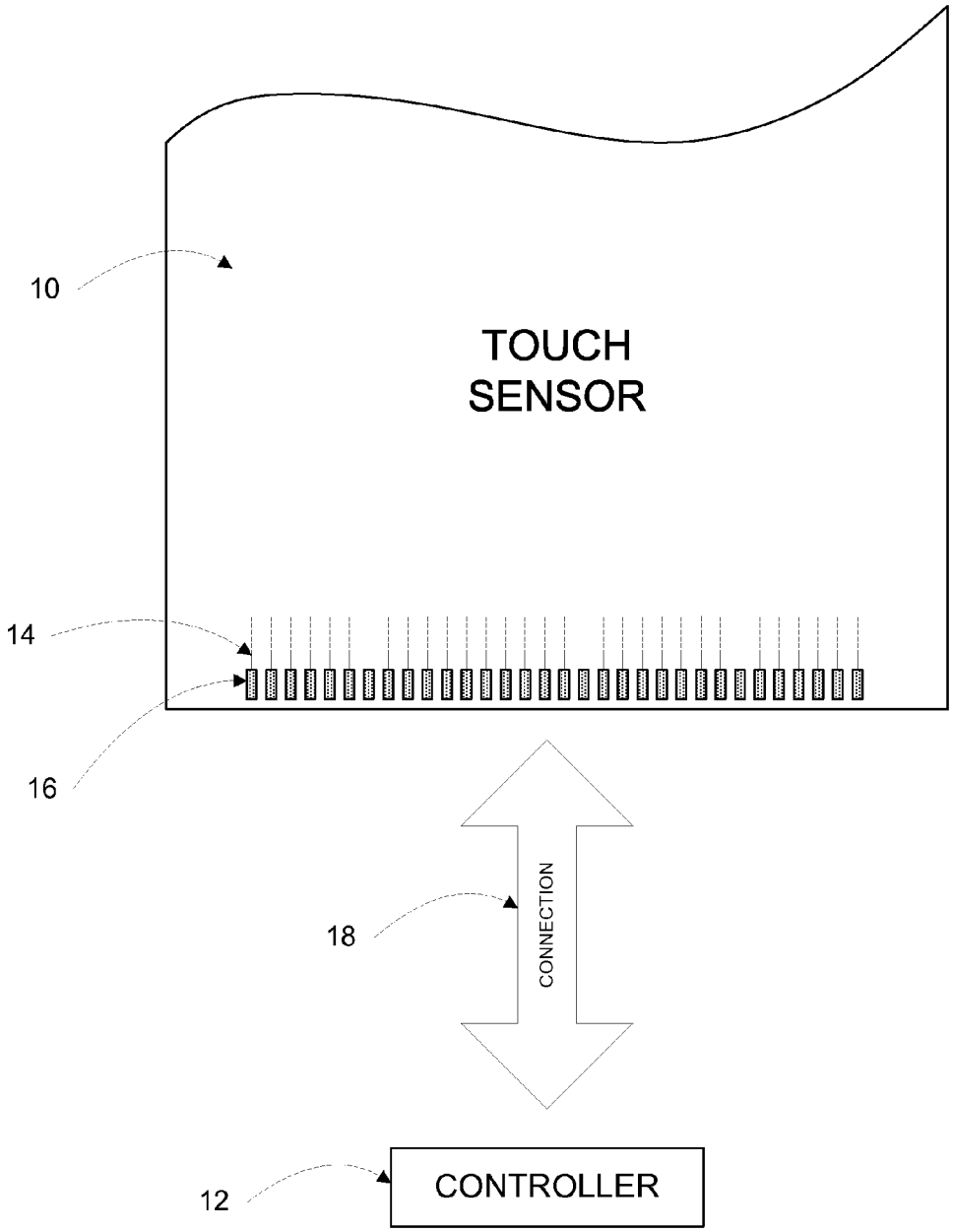
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. In particular embodiments, a touch-sensor controller may be referred to as a touch controller. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, carbon, or a copper-, silver-, or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
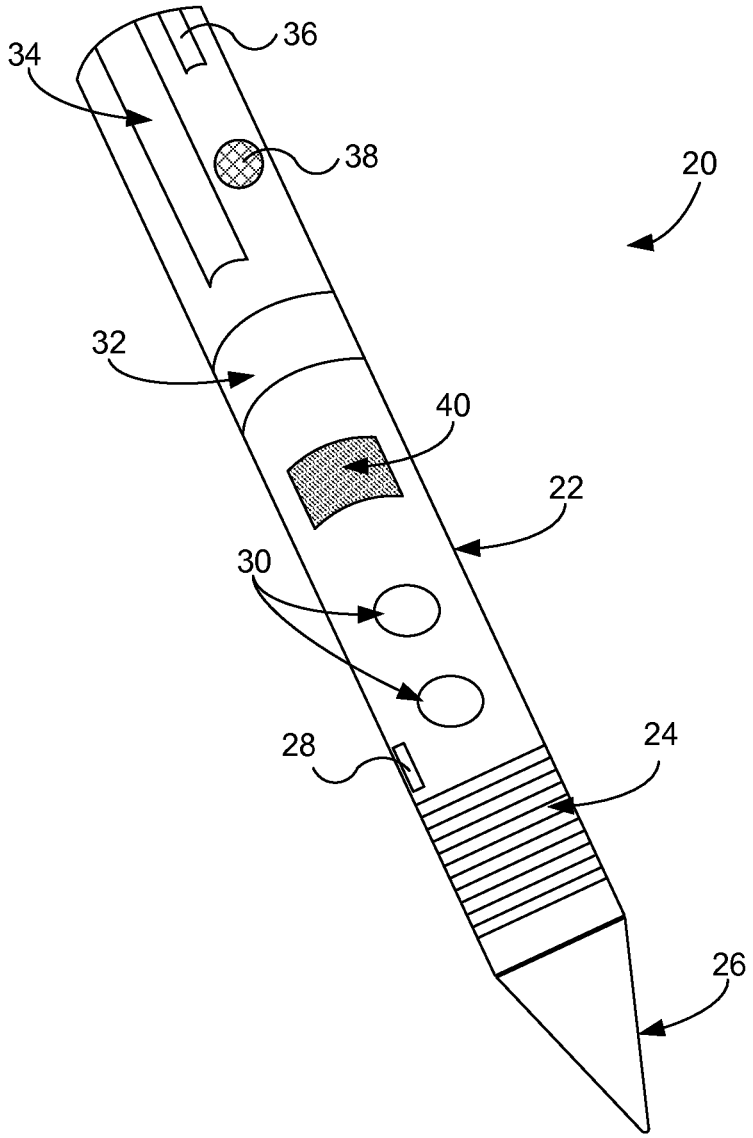
FIG. 2 illustrates an example active stylus exterior.

FIG. 2 illustrates an example exterior of an example active stylus 20, which may be used in conjunction with touch sensor 10 of FIG. 1. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may be any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g., 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using an FPC.

Active stylus 20 may have one or more components configured to provide feedback to or accept feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or an electrophoretic display. As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionality. For example and not by way of limitation, dragging a finger across modified surface area 40 may initiate an interaction, such as data transfer, between active stylus 20 and a device.

One or more components of active stylus 20 may be configured to communicate a signal or data between active stylus 20 and a device. In particular embodiments, active stylus 20 may have a tip 26 located at an end of active stylus 20, and tip 26 may include one or more electrodes configured to communicate data between active stylus 20 and one or more devices or other active styluses. By way of example and without limitation, the electrodes of active stylus 20 may reside on outer body 22 of active stylus, in active-stylus tip 26, or on or in any other suitable part of active stylus 20. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
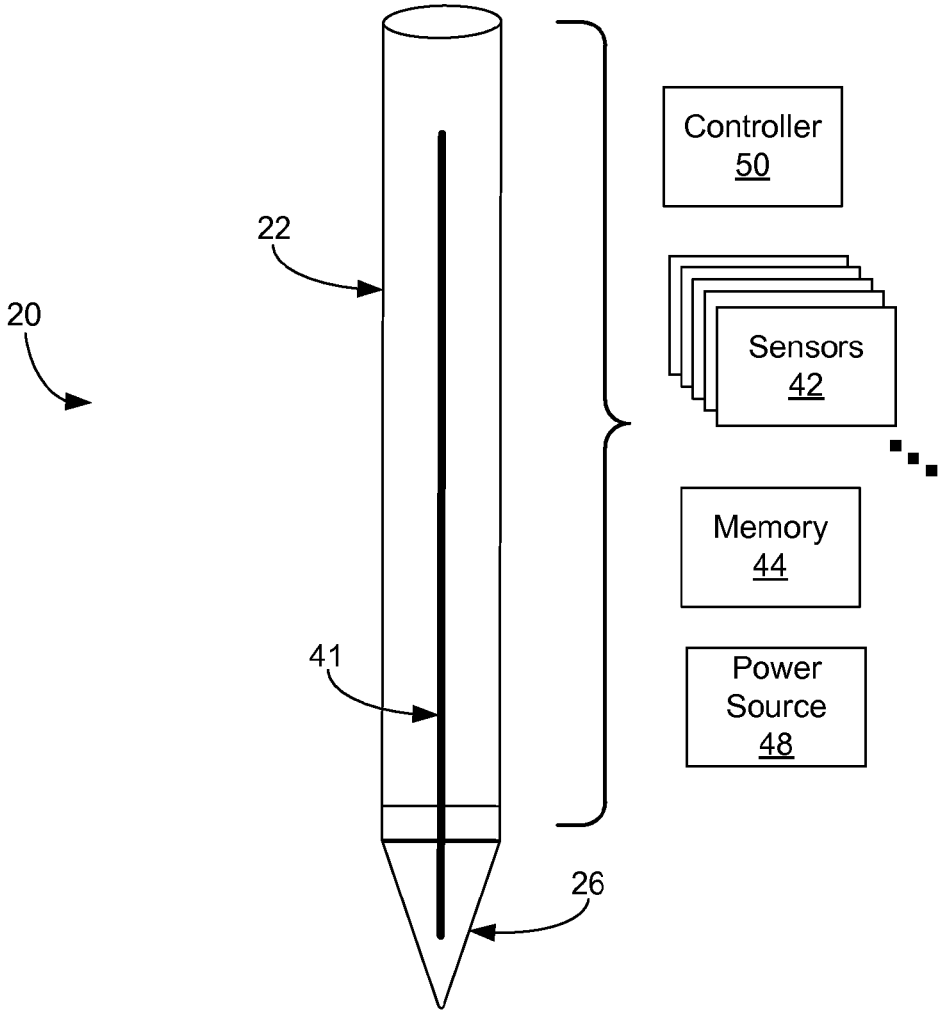
FIG. 3 illustrates an example active stylus interior.

FIG. 3 illustrates example internal components of an example active stylus 20. Active stylus 20 includes one or more components, such as a controller 50, sensors 42, memory 44, or power source 48. In particular embodiments, one or more components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of computing device or processor suitable for controlling the operation of active stylus 20. Controller 50 may be one or more ICs—such as, for example, general-purpose microprocessors, microcontrollers, programmable logic devices (PLDs), programmable logic arrays (PLAs), or ASICs. Controller 50 may include a processor unit, a drive unit, a sense unit, and a storage unit. In particular embodiments, a processor unit in controller 50 may control the operation of electrodes in active stylus 20, either via drive or sense units or directly. The drive unit may supply signals to electrodes of tip 26 through center shaft 41. The drive unit may also supply signals to control or drive sensors 42 or one or more external components of active stylus 20. In particular embodiments, the drive unit of active stylus 20 may be configured to transmit a signal that may be detected by electrodes of touch sensor 10. As an example and not by way of limitation, the drive unit of active stylus 20 may include a voltage pump or a switch, such that the voltage pump may generate a high voltage signal, or the switch may toggle the potential of tip 26 between zero voltage and one or more pre-determined voltage levels. The drive unit of active stylus 20 may transmit a signal, such as a square wave, sine wave, or digital-logic signal, that may be sensed by the electrodes of touch sensor 10. In particular embodiments, the drive unit of active stylus 20 may transmit a signal to the electrodes of touch sensor 10 by applying a voltage or current to electrodes of tip 26 that results in charge removal or charge addition to the electrodes of touch sensor 10, mimicking a touch or anti-touch of a finger on a pulse-by-pulse basis.

The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may include a primary battery, such as for example an alkaline battery, or a rechargeable battery, such as for example a lithium-ion or nickel-metal-hydride battery. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered or recharged by a wired connection through an applicable port coupled to a suitable power source.

Figure 4:
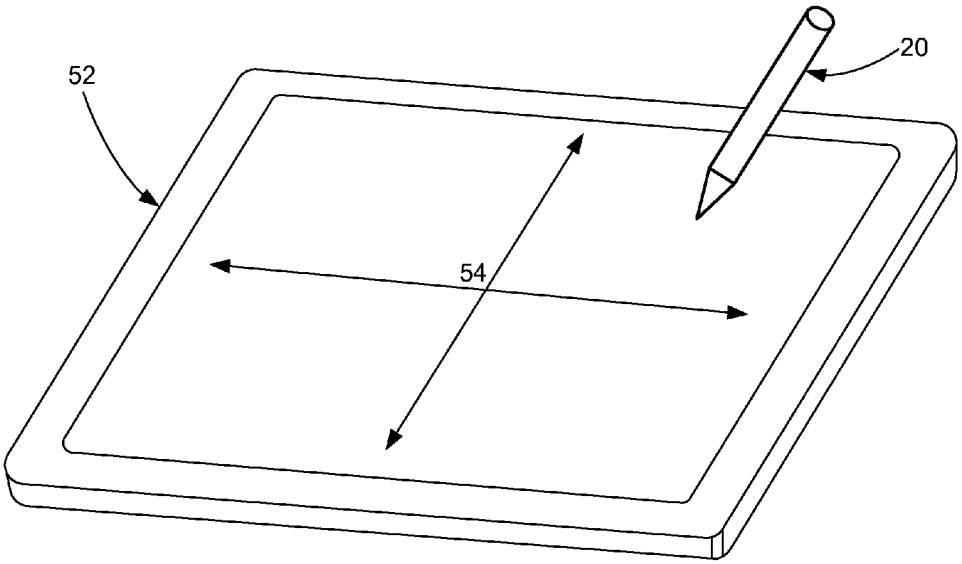
FIG. 4 illustrates an example active stylus with an example device.

FIG. 4 illustrates an example active stylus 20 with an example device 52. Device 52 may include a touch sensor similar to touch sensor 10 of FIG. 1. Device 52 may be any suitable device that includes a touch sensor, such as, for example and without limitation, a desktop computer, laptop computer, tablet computer, personal digital assistant (PDA), smartphone, satellite navigation device, portable media player, portable game console, kiosk computer, point-of-sale device, or other suitable device. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As an example and not by way of limitation, device 52 electronics may include circuitry or other electronics for wireless communication to or from device 52, executing programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device 52 by processing a drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. In particular embodiments, interaction between active stylus 20 and device 52 may occur when tip 26 of active stylus 20 is in contact with or in proximity to device 52. As an example and not by way of limitation, active stylus 20 may transmit tip pressure information (e.g., an amount of pressure being applied to tip 26) to device 52. As another example and not by way of limitation, active stylus 20 may transmit a status of a button or switch (e.g., button 30 is pressed or in a closed state; or button 30 is not pressed or is in an open state) to device 52. A user may press a button 30 while active stylus 20 is in proximity of touch-sensitive area 54 of device 52, and based on the button 30 being pressed, active stylus 20 may interact with device 52 to initiate a mouse-type function, such as for example, a mouse click (e.g., a left, right, or middle mouse click) or a mouse hover. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, one or more measurement signals from sensors 42 of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Active stylus 20 may receive signals from external sources, including device 52, a user, or another active stylus. Active stylus 20 may encounter noise when receiving such signals. As examples, noise may be introduced into the received signals from data quantization, limitations of position-calculation algorithms, bandwidth limitations of measurement hardware, accuracy limitations of analog front ends of devices with which active stylus 20 communicates, the physical layout of the system, sensor noise, charger noise, device noise, noise from device 52 display, stylus circuitry noise, or external noise. The overall noise external to active stylus 20 may have frequency characteristics covering a wide range of the spectrum, including narrow-band noise and wide-band noise, as well.

In particular embodiments, a signal may be received by one or more electrodes capable of sensing signals in active stylus 20. These electrodes may reside on or within active-stylus tip 26. The signal received by the electrodes in active stylus 20 may then be transmitted from the electrodes to controller 50. In particular embodiments, a signal may be transmitted to controller 50 via center shaft 41. Controller 50, as discussed above, may include, without limitation, a drive unit, a sense unit, a storage unit, and a processor unit. In particular embodiments, a received signal may be amplified by any suitable amplifier, including a digital or an analog amplifier. In particular embodiments, a received signal may be filtered by any suitable filter, including a digital or an analog filter. In particular embodiments, device 52 may transmit data to active stylus 20 by sending data to one or more drive electrodes of touch sensor 10, and active stylus 20 may receive data via electrodes of tip 26. In particular embodiments, after active stylus 20 and device 52 are synchronized, active stylus 20 may transmit data to device 52 by performing charge addition or charge removal on one or more sense electrodes of touch sensor 10, and device 52 may receive data sent from active stylus 20 by sensing data with one or more sense electrodes of touch sensor 10.

In particular embodiments, an electronic device (e.g., active stylus 20) may include a clock having a clock period, and the clock may produce a periodic electronic signal that oscillates between a high voltage state (e.g., approximately 1.8 V, 2.5 V, or 3.3 V) and a low voltage state (e.g., approximately 0 V). The clock period (which may be referred to as a stylus clock period or an active-stylus clock period) may be approximately equal to a duration of one cycle of the clock, which may be referred to as a clock cycle. The frequency of the clock may be approximately equal to the reciprocal of the clock period. As an example and not by way of limitation, an active-stylus clock may have a clock frequency between approximately 3 and 25 MHz, and the active-stylus clock may have an active-stylus clock period between approximately 40 and 340 nanoseconds. As another example and not by way of limitation, active stylus 20 (which may be referred to as stylus 20) may have a clock with a clock frequency of approximately 3 MHz, 6 MHz, 12 MHz, or 24 MHz, and the stylus clock may have a corresponding clock period of approximately 333 nanoseconds, 167 nanoseconds, 83 nanoseconds, or 42 nanoseconds, respectively. In particular embodiments, a clock of stylus 20 may be referred to as a stylus clock, an active-stylus clock, a clock generator, or a system clock. In particular embodiments, a stylus-clock signal may have any suitable format (e.g., square wave, triangle wave, sawtooth wave, sinusoidal wave) and any suitable duty cycle (e.g., 25%, 50%, or 75% duty cycle). As an example and not by way of limitation, a stylus clock may produce a periodic two-level digital signal (e.g., a square wave) with alternating rising and falling edges that occur at regular intervals, and the clock period may be approximately equal to the time interval between consecutive rising edges or consecutive falling edges. As another example and not by way of limitation, a stylus clock may have a clock frequency of 12 MHz (corresponding to a clock period of $1/12$ MHz≅83 nanoseconds), and the clock signal may be a square wave with a 50% duty cycle.

In particular embodiments, a clock of stylus 20 may be included as part of controller 50, or a stylus clock may be a separate internal component of stylus 20. As an example and not by way of limitation, a clock of stylus 20 may include a resistor-capacitor (RC) oscillator, a multivibrator, a relaxation oscillator, or any other suitable electronic circuit configured to provide a periodic clock signal. In particular embodiments, a stylus clock may have a particular accuracy, drift, or stability, which represents an amount that the clock's frequency or period may vary over time or with temperature. In particular embodiments, a stylus clock may have a frequency stability of approximately 0.5%, 1%, 2%, 3%, 5%, or any suitable value. As an example and not by way of limitation, stylus 20 may have a clock with a nominal or average frequency of 12 MHz and a 3% variation in clock frequency so that the clock's frequency may vary between approximately 11.6 MHz and 12.4 MHz over a particular time period (e.g., one minute, one hour, or one day) or as temperature varies over a particular range (e.g., between 10° C. and 40° C.). A 12-MHz clock with a 3% variation may have a clock period that varies between approximately 80.6 nanoseconds and 86.2 nanoseconds. Although this disclosure describes particular stylus clocks having particular frequencies, clock periods, formats, duty cycles, and stabilities, this disclosure contemplates any suitable stylus clocks having any suitable frequencies, clock periods, formats, duty cycles, and stabilities.

Figure 5:
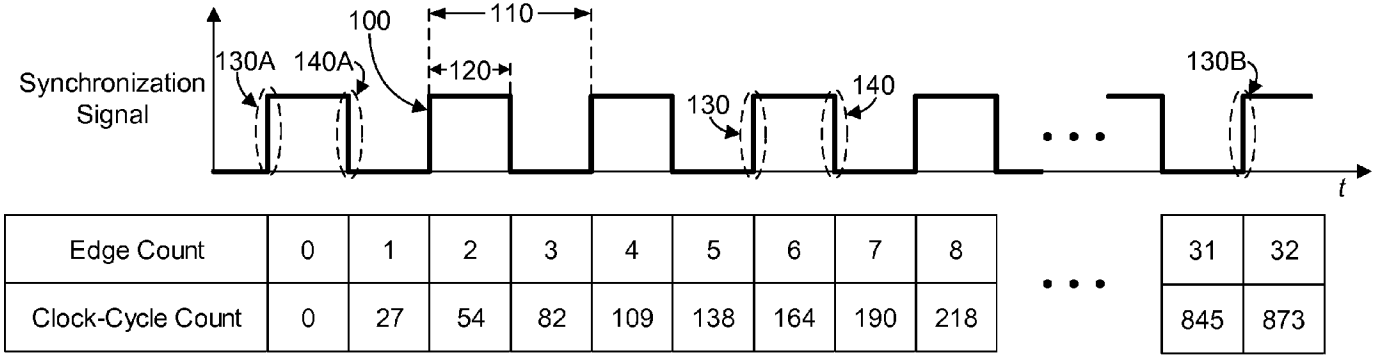
FIG. 5 illustrates an example synchronization signal with corresponding edge and clock-cycle counts.

FIG. 5 illustrates example synchronization signal 100 with corresponding edge and clock-cycle counts. In particular embodiments, an electronic device may be configured to wirelessly receive synchronization signal 100 from a second device. As an example and not by way of limitation, the electronic device may be a stylus 20 that includes one or more electrodes for wirelessly transmitting signals to or wirelessly receiving signals from touch sensor 10 or touch controller 12 of a second computing device. As another example and not by way of limitation, stylus 20 may have one transmit electrode for transmitting signals and another receive electrode for receiving signals. The second computing device may be a personal computing device, such as for example, device 52 illustrated in FIG. 4. As examples and not by way of limitation, a personal computing device may be a portable computing device, mobile phone, smartphone, tablet computer, laptop computer, desktop computer, or any other suitable computing device that includes touch sensor 10 for transmitting signals (e.g., synchronization signal 100) through electrodes of touch sensor 10 or for receiving input via a stylus or a person's touch (e.g., a person's finger). As an example and not by way of limitation, touch-sensor controller 12 of a personal computing device may drive the electrodes of touch sensor 10 with a voltage or current signal corresponding to synchronization signal 100 so that synchronization signal 100 is wirelessly transmitted to stylus 20. The wireless transmission of synchronization signal 100 may include a capacitive coupling between one or more electrodes of touch sensor 10 and one or more electrodes of stylus 20. In the example of FIG. 5, the horizontal axis represents time, and the vertical axis represents an amplitude of a characteristic of synchronization signal 100, such as for example an amplitude of a voltage, electric field, current, or power of synchronization signal 100 as transmitted by device 52 or as received by stylus 20. Although this disclosure describes and illustrates particular synchronization signals transmitted between particular devices in particular manners, this disclosure contemplates any suitable synchronization signals transmitted between any suitable devices in any suitable manners.

In particular embodiments, a synchronization routine may include stylus 20 receiving synchronization signal 100 from touch-sensitive area 54 of device 52 and determining one or more synchronization parameters from synchronization signal 100. In particular embodiments, a synchronization parameter may be related to a particular characteristic of synchronization signal 100, such as for example, a period, frequency, timing, phase, data rate, signal amplitude, jitter, duty cycle, or pulse duration associated with synchronization signal 100. In the example of FIG. 5, synchronization signal 100 has a synchronization-signal period 110 approximately equal to a duration of one cycle of synchronization signal 100. The duration of one cycle of synchronization signal 100 is equal to a duration of time between consecutive rising edges 130 (as illustrated by synchronization signal period 110 in FIG. 5) or consecutive falling edges 140 of synchronization signal 100. The frequency of synchronization signal 100 may be approximately equal to the reciprocal of synchronization-signal period 110. In particular embodiments, synchronization signal 100 may have any suitable format (e.g., square wave, triangle wave, sawtooth wave, sinusoidal wave) and any suitable duty cycle (e.g., 25%, 50%, or 75% duty cycle). In the example of FIG. 5, synchronization signal 100 is a two-level digital signal having a duty cycle of approximately 50% and having a series of alternating rising edges 130 and falling edges 140.

In particular embodiments, synchronization signal 100 may have a half-period 120 which is equal to one half of synchronization-signal period 110. For a synchronization signal 100 with a 50% duty cycle (such as the synchronzation signal illustrated in FIG. 5), half-period 120 may be equal to a duration of time between a rising edge 130 and a subsequent falling edge 140 (or the time between a falling edge 140 and a subsequent rising edge 130). In particular embodiments, synchronization signal 100 may have a frequency between approximately 100 kHz and 1 MHz and a synchronization-signal period 110 between approximately 1 and 10 microseconds. As an example and not by way of limitation, synchronization signal 100 may have a frequency of approximately 220 kHz and a corresponding synchronization-signal period 110 of approximately 4.545 μs. Additionally, the corresponding half-period 120 of synchronization signal 100 is approximately 2.273 μs.

In particular embodiments, device 52 may generate a synchronization signal 100 with a particular accuracy, drift, or stability, which represents an amount that the frequency or period of synchronization signal 100 may vary over time or with temperature. In particular embodiments, a synchronization signal 100 may have a frequency stability of 0.5%, 1%, 2%, 3%, 5%, or any suitable value. As an example and not by way of limitation, synchronization signal 100 may have a frequency of 320 kHz (and a corresponding synchronization-signal period 110 of approximately 3.13 μs) and a 3% variation so that the synchronization-signal frequency may vary between approximately 310 kHz and 330 kHz (and the synchronization-signal period may vary between approximately 3.03 μs and 3.22 μs). Although this disclosure describes and illustrates particular synchronization signals having particular frequencies, periods, formats, duty cycles, and stabilities, this disclosure contemplates any suitable synchronization signals having any suitable frequencies, periods, formats, duty cycles, and stabilities.

In particular embodiments, stylus 20 may receive synchronization signal 100 transmitted from touch-sensitive area 54 of device 52. In particular embodiments, based on the received synchronization signal 100, stylus 20 may determine a synchronization parameter that includes an integer part and a fractional part. In particular embodiments, a synchronization parameter may reflect a relationship between synchronization-signal period 110 and the stylus clock period. As examples and not by way of limitation, the synchronization parameter may correspond to a duration of time approximately equal to synchronization-signal period 110 or one-half of synchronization-signal period 110. In particular embodiments, the integer part of a synchronization parameter may represent a positive integer multiple of an active-stylus clock period, and the fractional part of a synchronization parameter may represent a fractional portion of the active-stylus clock period. As an example and not by way of limitation, the integer part may be 27 and may represent 27 clock cycles of the stylus clock (e.g., a duration of time equal to 27×T, where T is the stylus clock period), and the fractional part may be 0.28 and may represent 0.28 clock cycles (e.g., a duration of time equal to 0.28×T). In particular embodiments, determining a synchronization parameter may include one or more of the following steps: counting the number of stylus clock cycles until a particular quantity of edges of synchronization signal 100 is accumulated; dividing the number of counted clock cycles by the particular quantity of edges to determine a decimal number, the decimal number having an integer part and a fractional part; and assigning the integer part of the decimal number to the integer part of the synchronization parameter and the fractional part of the decimal number to the fractional part of the synchronization parameter. As an example and not by way of limitation, stylus 20 may count stylus clock cycles until 1, 5, 10, 25, 50, 100, or 500 edges, or any suitable number of edges of synchronization signal 100 are detected or received by stylus 20. In particular embodiments, the particular quantity of edges accumulated by stylus 20 may equal $2^n$, where n is a positive integer (e.g., the quantity of edges accumulated by stylus may be 2, 4, 8, 16, 32, 64, 128, etc.). Although this disclosure describes and illustrates particular synchronization parameters determined in particular manners, this disclosure contemplates any suitable synchronization parameters determined in any suitable manners.

In the example of FIG. 5, stylus 20 uses the Edge Count parameter to track edges of synchronization signal 100 until a total of 32 edges are detected. In particular embodiments, stylus 20 may track only rising edges 130, only falling edges 140, or both rising edges 130 and falling edges 140 of synchronization signal 100. In particular embodiments, stylus 20 may track rising edges 130 and falling edges 140 separately and may maintain two separate edge counters, one for rising edges 130 and one for falling edges 140. In the example of FIG. 5, stylus 20 counts both rising edges 130 and falling edges 140 together until a total of 32 edges are detected. The duration of time to accumulate the 32 edges corresponds to 32 half-periods 120, which is equal to 16 synchronization-signal periods 110. While accumulating the edges, stylus 20 uses the Clock-Cycle Count parameter to keep track of the number of stylus clock cycles. The Clock-Cycle Count parameter may be used to measure a time interval (e.g., a time interval between two edges of synchronization signal 100) in terms of stylus clock cycles. As an example and not by way of limitation, a counter (represented by Clock-Cycle Count) may be initialized to a value of zero and then, when triggered by an edge of synchronization signal 100 (e.g., rising edge 130A), the counter may begin to accumulate clock-cycle counts. The counter may increment by +1 for each stylus clock cycle. When triggered by another subsequent edge of synchronization signal 100 (e.g., rising edge 130B), the counter may cease accumulating clock-cycle counts, and the value of Clock-Cycle Count may indicate a time interval corresponding to a time between two particular edges of synchronization signal 100. In particular embodiments, the Clock-Cycle Count parameter may be stored in a register or memory location of a processor for later use in determining a synchronization parameter.

In particular embodiments, stylus 20 may begin counting edges after detecting an initial rising edge 130, falling edge 140, or either an initial rising edge 130 or falling edge 140. In FIG. 5, the initial rising edge 130A of synchronization signal 100 (which may be referred to as an initial edge or a zeroth edge) triggers the start of the edge counter and the clock-cycle counter, each of which has an initial value of zero. After the zeroth edge 130A, when the first edge (falling edge 140A) is detected, Edge Count becomes 1 and the Clock-Cycle Count becomes 27, which indicates that 27 stylus clock cycles have occurred between the zeroth edge and the first edge of synchronization signal 100. After the second edge is detected, Edge Count is 2, and Clock-Cycle Count is 54. After each subsequent edge is detected, Edge Count is incremented by 1, and Clock-Cycle Count is updated based on the total number of clock cycles that are counted by stylus 20 since the zeroth edge. As illustrated in FIG. 5, when the eighth edge is detected, Edge Count becomes 8, and Clock-Cycle Count is 218. In FIG. 5, tracking of edges and stylus clock cycles continues until 32 edges are counted. After the 32nd edge (rising edge 130B) is counted, Edge Count is 32, and the total number of stylus clock cycles since the initial rising edge 130A is 873. Although this disclosure describes and illustrates particular parameters used to track or measure particular synchronization signals, this disclosure contemplates any suitable parameters used to track or measure any suitable synchronization signals.

In the example of FIG. 5, synchronization signal 100 may have a frequency of 220 kHz (corresponding to a synchronization-signal period 110 of approximately 4.545 μs), and the stylus clock may have a frequency of 12 MHz (corresponding to a stylus clock period of approximately 83.3 nanoseconds). In FIG. 5, each accumulated edge count corresponds to one half-period 120 of synchronization signal or, equivalently, one half of synchronization-signal period 110. The duration of time to accumulate 32 edges corresponds to 32 half-periods 120 or, equivalently, 16 synchronization-signal periods 110. Based on the edge counts, the total duration of time to accumulate 32 edges is approximately 16×4.545 μs≅72.7 μs. Similarly, the corresponding total duration of time to accumulate the 873 clock cycles is approximately 873×83.3 ns=72.7 μs, which is consistent with the previous 72.7 μs time calculated based on edge counts.

In particular embodiments, after counting the number of clock cycles until a particular quantity of edges of synchronization signal 100 is accumulated, stylus 20 may divide the number of counted clock cycles by the quantity of edges to determine a decimal number with an integer part and a fractional part. In particular embodiments, the particular quantity of edges may equal $2^n$, where n is a positive integer, and dividing the number of counted clock cycles by the particular quantity of edges may include applying a right shift by n digits to bits representing the number of counted clock cycles. In the example of FIG. 5, controller 50 of stylus 20 may divide the value of Clock-Cycle Count (873) by the value of Edge Count (32) to obtain the decimal number: 873/32=27.28125. In particular embodiments, the decimal number may be truncated or rounded. As an example and not by way of limitation, the decimal number 27.28125 may be truncated or rounded to 27.3, 27.28, or 27.281. In the example of FIG. 5, stylus 20 may determine the decimal result of 873/32 to be 27.28, where 27 represents the integer part and 0.28 represents the fractional part. The integer part, 27, represents a positive integer multiple of clock cycles (e.g., 27 clock cycles of the stylus clock, or a duration of time equal to 27×T, where T is the stylus clock period). In particular embodiments, the fractional part, which corresponds to a fractional portion of the stylus clock period, may be represented by controller 50 as an integer. As an example and not by way of limitation, the fractional part 0.28 (which represents 0.28 clock cycles, or a duration of time equal to 0.28×T), may be represented as the integer 28. In particular embodiments, the fractional portion of the clock period represents greater than or equal to zero clock periods and less than one clock period (e.g., 0≤Fractional Portion<1).

In particular embodiments, a synchronization parameter may correspond to a duration of time related to synchronization-signal period 110. As examples and not by way of limitation, the synchronization parameter may correspond to a duration of time approximately equal to synchronization-signal period 110 or approximately equal to one half of synchronization-signal period 110 (which is equivalent to half-period 120). In the example of FIG. 5, the synchronization parameter corresponds to a duration of time approximately equal to half-period 120. If a synchronization parameter includes positive integer I (representing I clock periods) and fractional part F (representing F clock periods, where $0 \leq F < 1$), then for a stylus clock with a frequency f (and a corresponding period 1/f), the synchronization parameter corresponds to a duration of time of (I+F)/f. Based on the examples discussed above, for a 12-MHz clock frequency, an example synchronization parameter corresponds to 27.28 clock periods, or a duration of time of (27+0.28)/12 MHz≅2.273 μs. This 2.273 μs duration of time equals half-period 120 of synchronization signal 100, which has frequency 220 kHz.

In particular embodiments, stylus 20 may determine a synchronization parameter a single time, or stylus 20 may determine one or more synchronization parameters multiple times. As discussed above, in the example of FIG. 5, stylus 20 may determine the integer part and the fractional part of the synchronization parameter to be 27 and 0.28, respectively. In particular embodiments, stylus 20 may refine or update one or more values of a synchronization parameter multiple times. As an example and not by way of limitation, a subsequent measurement of a synchronization signal 100 may result in a clock-cycle count of 872 clock cycles for 32 edges. Stylus 20 may combine the subsequent measurement with one or more previous measurements to determine updated values for the integer part or the fractional part. As an example and not by way of limitation, combining the two measurements may result in 873+872=1745 clock cycles corresponding to a total of 64 edges, which (based on 1745/64≅27.27) results in updated values for the integer part and the fractional part of 27 and 0.27, respectively.

Figure 6:
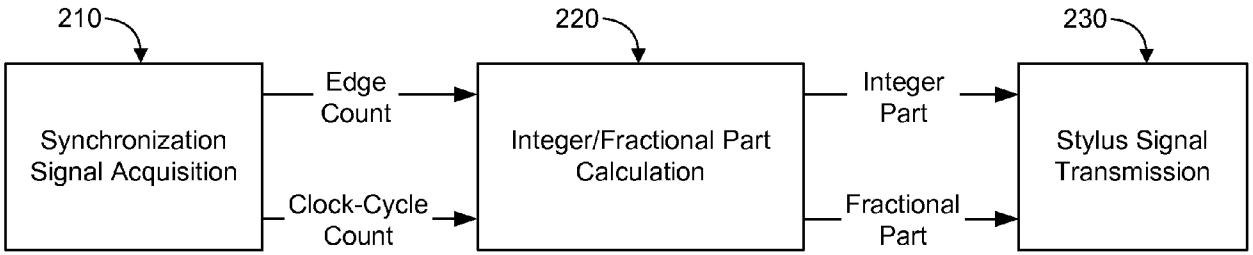
FIG. 6 illustrates an example block diagram associated with determining a synchronization parameter of a synchronization signal and transmitting information using the determined synchronization parameter.

FIG. 6 illustrates an example block diagram associated with determining a synchronization parameter of synchronization signal 100 and transmitting information using the determined synchronization parameter. In particular embodiments, one or more of the modules illustrated in FIG. 6 may be implemented in hardware, software, firmware, or any suitable combination of hardware, software, or firmware of stylus 20. In module 210, stylus 20 may listen for and acquire synchronization signal 100, and values for the Edge Count and Clock-Cycle Count may be determined. In particular embodiments, stylus 20 may use one or more electrodes to receive a signal (e.g., synchronization signal 100), and stylus 20 may analyze, filter, or process the received signal to determine whether it corresponds to a valid synchronization signal 100. As an example and not by way of limitation, stylus 20 may use a phase-locked loop or a correlator to look for one or more rising or falling edges having particular amplitudes, frequencies, or time intervals, and once a valid signal is identified, stylus 20 may analyze the signal to determine values for the Edge Count and Clock-Cycle Count, as described above. If a signal is lost or corrupted (e.g., by electrical noise) before a particular number of edges are detected, stylus 20 may return to listening for and identifying a possible valid synchronization signal 100. In particular embodiments, stylus 20 may combine a current measurement of Edge Count and Clock-Cycle Count with one or more previous measurements to produce an effective larger number of samples which may result in an improved accuracy for a determined synchronization parameter.

In particular embodiments, stylus 20 may have one or more preprogrammed frequencies or ranges of frequencies of synchronization signal 100 which it may be configured to receive. As an example and not by way of limitation, stylus 20 may be configured to receive synchronization signal 100 with a frequency of 100-110 kHz, 150-160 kHz, 210-230 kHz, 300-330 kHz, or 495-500 kHz, and stylus 20 may determine whether the frequency of synchronization signal 100 is consistent with one of these preprogrammed frequencies. In other particular embodiments, stylus 20 may be configured to receive any frequency over a broad range of frequencies. As an example and not by way of limitation, stylus 20 may be configured to receive synchronization signal 100 with any frequency in a range of 100-500 kHz or 100-1000 kHz. In particular embodiments, stylus 20 may analyze a received synchronization signal 100 to determine whether it corresponds to a previously received synchronization signal 100. As an example and not by way of limitation, stylus 20 may have received a previous synchronization signal 100 with a 220 kHz frequency. Later, during a subsequent synchronization routine, stylus 20 may receive another synchronization signal 100, and stylus 20 may analyze the latest synchronization signal 100 to see if it has a 220 kHz frequency. If synchronization signal 100 has a 220 kHz frequency, stylus 20 may combine previously determined Edge Count and Clock-Cycle Count values with newly determined values of these parameters, as described above. Otherwise, the frequency of synchronization signal 100 from device 52 may have drifted (e.g., due to a time- or temperature-related variation of a frequency of device 52) or the frequency may have changed (e.g., stylus 20 is being synchronized to a different device than it was previously synchronized to), and stylus 20 may discard previously determined Edge Count and Clock-Cycle Count values and proceed to analyze the latest synchronization signal 100 without regard to previously determined parameters.

In particular embodiments, in addition to determining values for Edge Count and Clock-Cycle Count, synchronization signal acquisition module 210 may also determine a timing or a phase of synchronization signal 100. In particular embodiments, the timing or phase of a signal may refer to one or more times where one or more features (e.g., rising edge 130 or falling edge 140) of a signal occur. In particular embodiments, the timing of synchronization signal 100 may be determined by measuring one or more times where one or more edges of synchronization signal 100 occur. The timing of synchronization signal 100, along with synchronization-signal period 100, may be used to determine times when stylus 20 may transmit data to device 52. Although this disclosure describes and illustrates particular modules configured to determine particular synchronization parameters, this disclosure contemplates any suitable modules configured to determine any suitable synchronization parameters.

In the example of FIG. 6, after values for the Edge Count and Clock-Cycle Count are determined, these values are passed to module 220 which calculates a synchronization parameter that includes the parameters Integer Part and Fractional Part. As described above, module 220 may divide Clock-Cycle Count by Edge Count to determine a decimal number with an integer part and a fractional part. The integer part of the decimal number, which represents a positive integer multiple of clock cycles, may be assigned to the Integer Part parameter, and the fractional part of the decimal number, which represents a fractional number of clock cycles, may be assigned to the Fractional Part parameter.

Figures 7, 8:
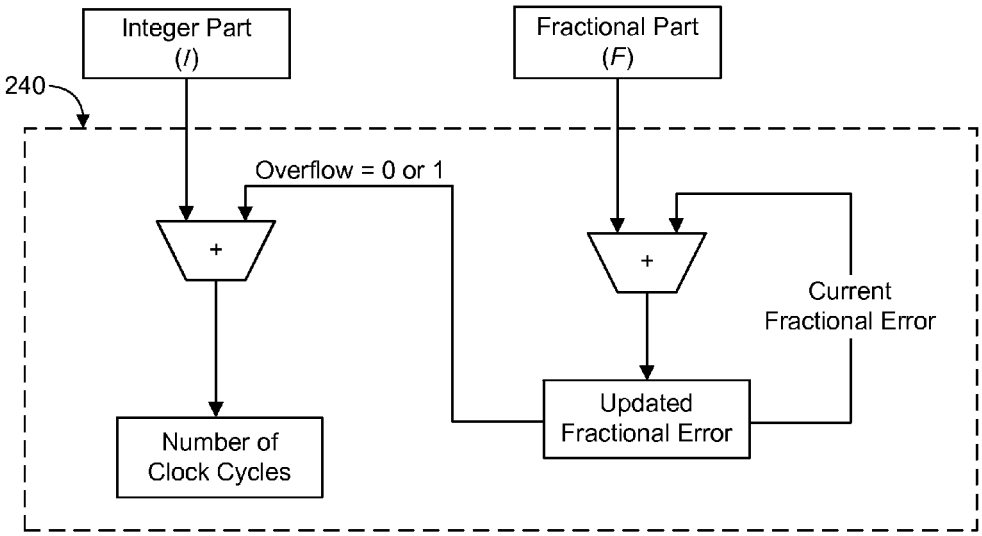
FIG. 7 illustrates a block diagram of an example routine for determining time intervals for transmitting data.
FIG. 8 illustrates a table with example values related to determining time intervals for transmitting data.

In the example of FIG. 6, the values for Integer Part and Fractional Part are passed to module 230 which produces a stylus signal for transmission to device 52. As an example and not by way of limitation, stylus 20 may wirelessly transmit information to device 52 by performing charge removal or charge addition to electrodes of touch sensor 10 at times that are based at least in part on the Integer Part and Fractional Part values. Additionally, the phase or timing with which the information is transmitted may be based on a determined phase or timing of synchronization signal 100. In particular embodiments, stylus 20, which is configured to transmit information based on an integer part and a fractional portion of stylus clock cycles, may be referred to as a stylus with fractional clock-cycle timing. FIG. 7 illustrates a block diagram of example routine 240 for determining time intervals for transmitting data. In particular embodiments, a time interval (which may be referred to as a data-transmission time interval) may be expressed in terms of an integer number of stylus clock cycles. In particular embodiments, routine 240 illustrated in FIG. 7 may represent part of stylus signal transmission module 230 illustrated in FIG. 6. All or part of example routine 240 illustrated in FIG. 7 may be implemented in hardware, software, firmware, or any suitable combination thereof. In particular embodiments, stylus 20 may be configured to wirelessly transmit information for reception by a second computing device (e.g., device 52). In particular embodiments, information transmitted by stylus 20 may include a series of data portions, where each successive data portion in the series is separated from a preceding data portion by a time interval. As an example and not by way of limitation, each data portion may correspond to one bit, and each successive bit may be separated in time from a preceding bit by a particular data-transmission time interval. As another example and not by way of limitation, each data portion may correspond to a pulse of electronic charge added to or removed from one or more electrodes of touch sensor 10 by stylus 20.

In particular embodiments, each data-transmission time interval may be based at least in part on a synchronization parameter determined from synchronization signal 100. As described above, a synchronization parameter may include integer part I and fractional part F. In particular embodiments, a time interval between successive data portions may equal either a positive integer multiple of the clock period or a positive integer multiple of the clock period plus one clock period. As an example and not by way of limitation, if I represents the positive integer multiplier determined from synchronization signal 100 and $\Delta t$ represents the stylus clock period, then the time interval ($\Delta T$) between each successive data portion is either $\Delta T = I \times \Delta t$ or $\Delta T = (I+1) \times \Delta t$. For the example discussed above where I is 27, the time interval between successive data portions is either 27 stylus clock cycles or 28 stylus clock cycles. Continuing with this example, if the stylus clock frequency is 12 MHz (corresponding to a clock period of 83.3 ns) and the synchronization-signal frequency is 220 kHz, then the time interval between successive data portions is either approximately 2.25 μs 27×83.3 ns) or 2.33 μs 28×83.3 ns), each of which is within one clock cycle (83.3 ns) of the 2.27 μs half-period 120 of synchronization signal 100. Although this disclosure describes and illustrates particular time intervals between particular data portions, this disclosure contemplates any suitable time intervals between any suitable data portions.

In particular embodiments, prior to transmitting each successive data portion, stylus 20 may determine a time interval by which the successive data portion may be separated from a preceding data portion. As an example and not by way of limitation, after transmitting a first data portion, stylus 20 may wait until the determined time interval (in terms of stylus clock cycles) has elapsed, at which time stylus 20 may then transmit a second data portion. In the example of FIG. 7, routine 2 receives Integer Part (I) and Fractional Part (F) as inputs, where I and F represent the synchronization parameter described above. As an example and not by way of limitation, I may be 27 and F may be 0.28. Initially, a first portion of data is transmitted by stylus 20 to device 52, where the timing of this first portion may be based on a timing or phase of synchronization signal 100. After the first data portion is transmitted, successive data portions are transmitted with a particular time interval between each successive portion and the preceding portion, where the time interval may be determined based on routine 240. When routine 240 first begins, Current Fractional Error has an initial value of 0. As illustrated in FIG. 7, a value for Updated Fractional Error may be determined, where Updated Fractional Error value equals Current Fractional Error plus F (the fractional portion of the clock period). If the value of Updated Fractional Error is less than one, then Overflow is assigned a value of 0, and the time interval is set to be the positive integer multiple of the clock period (e.g., time interval=I clock cycles). Otherwise, if Updated Fractional Error is greater than or equal to one, then Overflow is assigned a value of 1, and the time interval is set to be the positive integer multiple of the clock period plus one clock period (e.g., time interval=(I+1) clock cycles), and Updated Fractional Error is decremented by one. Then, Updated Fractional Error becomes the Current Fractional Error value which is fed back into the routine for the next iteration. In particular embodiments, the Current Fractional Error may be referred to as a Cumulative Error.

The following provides example pseudocode that implements routine 240 illustrated in FIG. 7.

```
I = Integer Part
F = Fractional Portion
Fractional Error = 0
/* N is the number of data portions to transmit */
Repeat N times:
  Fractional Error = Fractional Error + F
  If (Fractional Error < 1): Overflow = 0
    Else:
      Overflow = 1
      Fractional Error = Fractional Error − 1
  Time Interval = I + Overflow
  Transmit next data portion using Time Interval
Return
```

Although this disclosure describes and illustrates particular routines for determining particular data-transmission time intervals in particular manners, this disclosure contemplates any suitable routines for determining any suitable data-transmission time intervals in any suitable manner.

FIG. 8 illustrates a table with example values related to determining time intervals for transmitting data. In the example of FIG. 8, Integer Part (I) is 27 and Fractional Portion (F) is 0.28, and the values for Number of Clock Cycles, Overflow, Fractional Error, and Cumulative Error (also referred to as Current Fractional Error) are determined based on routine 240 described above and illustrated in FIG. 7. The Iteration value represents the number of times the routine has been performed. For the initial, or zeroth, iteration, stylus 20 may transmit a first portion of data, and the timing of when this first portion of data is transmitted may be based at least in part on a timing or phase of synchronization signal 100. After the first data portion is transmitted, each subsequent data portion is transmitted at a particular time interval after the previous data portion, where the time interval is determined from the values of Overflow and Fractional Error. As illustrated in FIG. 8, the second portion of data (represented by Iteration 1) is transmitted 27 clock cycles after the first data portion is transmitted. Similarly, the data portions for Iterations 2 and 3 are also transmitted 27 clock cycles after the corresponding previous data portion. For Iterations 1, 2, and 3, Overflow is 0, and the values for both Fractional Error and Cumulative Error are 0.28, 0.56, and 0.84, respectively. For Iteration 4, Fractional Error is 1.12. In this case, since Fractional Error≤1, Overflow is set to 1, and the time interval is set to 27+1=28 clock cycles. Also, Fractional Error is decremented by 1, so that Fractional Error has an updated value of 0.12, which is then assigned to Cumulative Error for the next iteration. For Iteration 5, with an initial Cumulative Error of 0.12, the value of Fractional Error becomes 0.12+0.28=0.40. The iterations continue with a time interval of either 27 or 28 stylus clock cycles being determined for each transmitted data portion.

Figure 9:
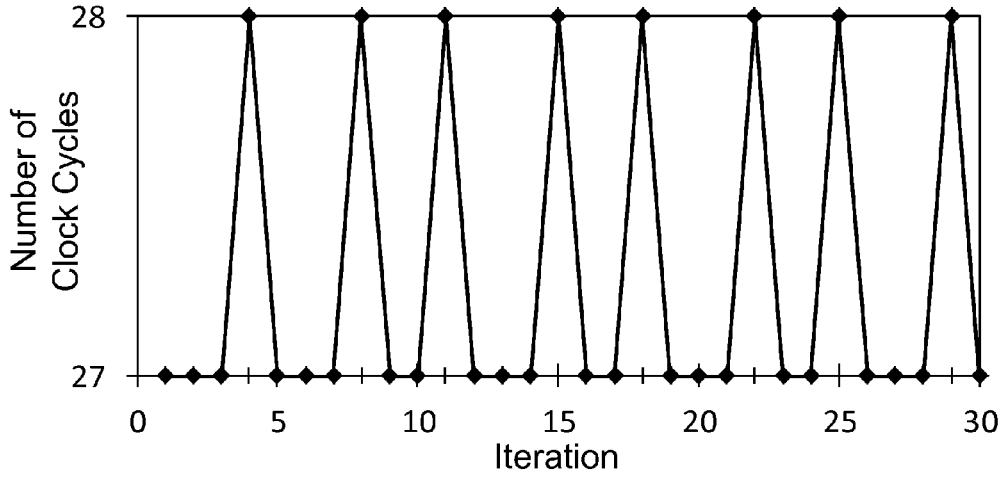
FIG. 9 illustrates an example graph of Number of Clock Cycles versus Iteration.

FIG. 9 illustrates an example graph of Number of Clock Cycles versus Iteration. The graph of FIG. 9 represents a time interval (in terms of number of stylus clock cycles) between consecutive data portions for each iteration of routine 240. In particular embodiments, a time interval between two consecutive data portions may refer to a duration of time between one or more features (e.g., a rising edge, a falling edge, an initial part of a data portion, an end part of a data portion, a maximum, or any other suitable feature) of the two data portions. In the example of FIG. 9, Integer Part (I) is 27 and Fractional Part (F) is 0.28, and the time interval determined for each transmitted data portion is either 27 or 28 stylus clock cycles. As an example and not by way of limitation, the first four values for Number of Clock Cycles in FIG. 9 are 27, 27, 27, and 28, which are consistent with the values for Iterations 1-4 listed in the Number of Clock Cycles column in FIG. 8. In FIG. 9, the time interval varies between 27 and 28 clock cycles, with two to three consecutive iterations having a time interval of 27 clock cycles followed by a single iteration having 28 clock cycles. For the 30 iterations illustrated in the example of FIG. 9, 22 iterations have a time interval of 27 clock cycles, and 8 iterations have 28 clock cycles. This gives an average number of clock cycles per iteration of (22×27+8×28)/30≅27.27, which is within 0.04% of the corresponding synchronization parameter 27.28 described above. In particular embodiments, by transmitting data at time intervals that vary between particular integer numbers of stylus clock cycles as described herein, stylus 20 may maintain synchronization with device 52 even though device 52 may not broadcast a synchronization signal while stylus 20 is transmitting data. As an example and not by way of limitation, stylus 20 may determine a synchronization parameter based on a series of 16 edges of synchronization signal 100 received from device 52, and stylus 20 may then be able to synchronously transmit approximately 20-40 bits of data to device 52 without receiving additional synchronization signals. Although this disclosure describes and illustrates particular time intervals for transmitting particular data portions, this disclosure contemplates any suitable time intervals for transmitting any suitable data portions.

Figure 10:
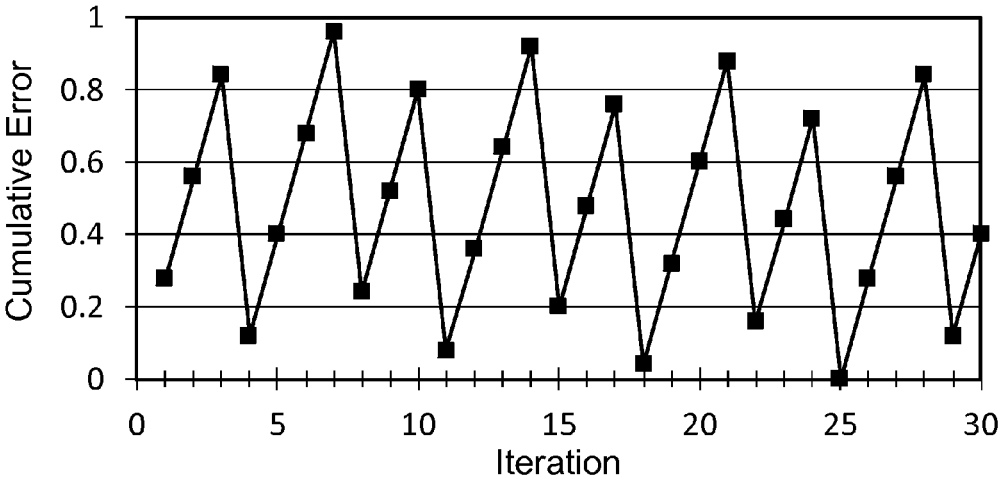
FIG. 10 illustrates an example graph of Cumulative Error versus Iteration.

FIG. 10 illustrates an example graph of Cumulative Error versus Iteration. In particular embodiments, Cumulative Error may represent an amount of accumulated timing error (in terms of stylus clock cycles) of data transmitted by stylus 20 with respect to a timing window of device 52 (e.g., a window during which device 52 may integrate charge received by touch sensor 10). In particular embodiments, each data portion transmitted by stylus 20 may have a timing offset or jitter with respect to a corresponding timing or data-receive window of device 52, and Cumulative Error is a parameter that tracks the accumulated error over time. The first three values for Cumulative Error in FIG. 10 are 0.28, 0.56, and 0.84 clock cycles, which are consistent with the values for Iterations 1-3 listed in the Cumulative Error column in FIG. 8. For the fourth iteration, the value for Number of Clock Cycles in FIG. 9 is 28, and the corresponding value for Cumulative Error in FIG. 10 drops down o 0.12 clock cycles. In particular embodiments, a routine for determining a time interval for transmitting a portion of data may be configured to provide a Cumulative Error value that varies by less than or equal to one stylus clock cycle where the Cumulative Error value has any suitable range of variation. As illustrated in FIG. 10, the cumulative timing offset of data transmitted by stylus 20 to device 52, as represented by the Cumulative Error value, may be maintained within a range of less than one clock cycle and greater than or equal to zero clock cycles. As another example and not by way of limitation, a routine for determining a time interval may be configured to provide a Cumulative Error value that has a range of variation of less than +0.5 clock cycles and greater than or equal to −0.5 clock cycles or a range of variation of less than or equal to 0 clock cycles and greater than −1.0 clock cycles. Although this disclosure describes and illustrates particular cumulative error values having particular ranges of variation, this disclosure contemplates any suitable cumulative error values having any suitable ranges of variation.

Figure 11:
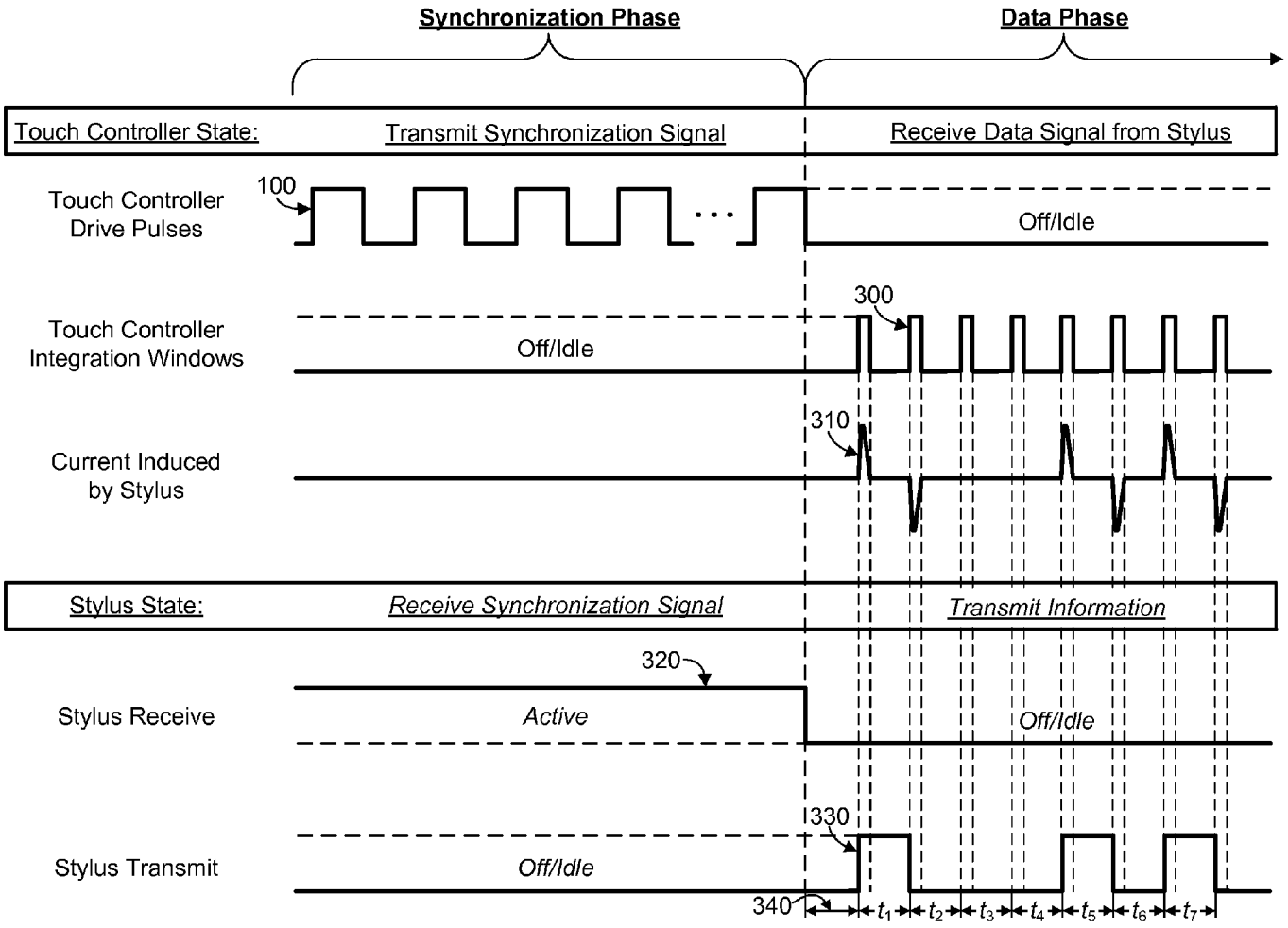
FIG. 11 illustrates an example timing diagram with example touch-controller signals and example stylus signals.

FIG. 11 illustrates an example timing diagram with example touch controller signals 100, 300, and 310 and example stylus signals 320 and 330. In particular embodiments, during a synchronization phase, stylus 20 may receive synchronization signal 100 from touch controller 12 or touch sensor 10 of a device (e.g., device 52), and during a data phase, stylus 20 may transmit information signal 330 to device 52. As illustrated in FIG. 11, during the synchronization phase, touch controller 12 may produce synchronization signal 100 by supplying touch controller drive pulses (e.g., voltage or current pulses) to one or more electrodes of touch sensor 10. In particular embodiments, touch controller 12 may send a synchronization signal 100 with a particular number of edges or cycles (e.g., 2, 4, 8, 16, 32, 64, or any suitable number of edges or cycles). Additionally, during the synchronization phase, touch controller integration windows 300 may be off or idle (e.g., touch sensor 10 may not listen for any data input from stylus 20). As illustrated in FIG. 11, during the synchronization phase, stylus receive circuitry status 320 may be active (e.g., stylus electrodes may be configured to wirelessly receive synchronization signal 100 and controller 50 may analyze any received signals to look for a valid synchronization signal 100), and stylus transmit circuitry may be off or idle (e.g., stylus 20 is not transmitting information). Although this disclosure describes and illustrates particular devices having particular signals during a synchronization phase, this disclosure contemplates any suitable devices having any suitable signals during a synchronization phase.

In particular embodiments, after transmitting synchronization signal 100, device 52 may enter a data phase where no drive signal is applied to touch sensor 10 (e.g., touch controller drive pulses are off or idle) and touch controller 12 or touch sensor 10 are configured to listen for data transmitted by stylus 20. If, after a particular amount of time, device 52 does not detect a valid signal from stylus 20, device 52 may return to a synchronization phase and transmit another synchronization signal 100. In particular embodiments, prior to returning to the synchronization phase, device 52 may pause or enter an idle state for a period of time. In particular embodiments, device 52 may continue to periodically broadcast synchronization signal 100 and then listen for a response (e.g., induced current signal 310) until a valid response is detected. In particular embodiments, after a particular amount of time elapses without receiving any response, device 52 may enter an idle or sleep mode.

In particular embodiments, once stylus 20 detects a valid synchronization signal 100, stylus may determine one or more synchronization parameters associated with synchronization signal 100. In particular embodiments and as described above, a synchronization parameter may include integer part I (representing I stylus clock periods) and fractional part F (representing F stylus clock periods, where $0 \leq F < 1$). In particular embodiments, a synchronization parameter may include a phase of synchronization signal 100, where the phase is related to a timing corresponding to a rising or fall edge of synchronization signal 100. In particular embodiments, after detecting a valid synchronization signal 100, stylus enters the data phase where stylus 20 may apply stylus transmit signal 330 (e.g., a voltage or current signal) to one or more stylus electrodes. Stylus transmit signal 330 includes a series of data portions that may be wirelessly transmitted to device 52. In particular embodiments, a first data portion of the series of data portions may be transmitted at time interval 340 based on a determined phase of synchronization signal 100. Subsequent data portions may be transmitted at time intervals (e.g., $t_1$, $t_2$, $t_3$, etc.) based on integer part I and fractional part F, as described above. As an example and not by way of limitation, each time interval may equal I stylus clock cycles (e.g., 27 clock cycles) or (I+1) clock cycles (e.g., 28 clock cycles).

In particular embodiments, each data portion of stylus transmit signal 330 may correspond to one bit or to a portion of one bit. As an example and not by way of limitation, one data portion may correspond to one bit of data. As another example and not by way of limitation, one data portion may correspond to one-half of a bit so that two data portions together may represent a single bit of data. This disclosure contemplates any suitable number of data portions being used to represent one or more bits of data. Although this disclosure describes and illustrates particular devices having particular signals during a data phase, this disclosure contemplates any suitable devices having any suitable signals during a data phase.

In the example of FIG. 11, the rising edges and the falling edges of stylus transmit signal 330 each represent one data portion, and one rising edge and one falling edge together represent a single bit of data. Signal 330 represents an electrical current or voltage applied to one or more stylus electrodes, and signal 310 represents a resulting signal induced by signal 330 at one or more electrodes of touch sensor 10 of device 52. A rising edge of stylus transmit signal 330 induces a positive current or charge pulse at touch sensor 10, as indicated by the corresponding positive pulse in signal 330. Similarly, a falling edge of stylus transmit signal 330 induces a negative current or charge pulse at touch sensor 10. Touch sensor 10 receives and integrates the induced charge or current, and the timing of the integration is based on touch controller integration window signal 300. In particular embodiments, touch sensor 10 may reverse the measurement polarity of successive current or charge signals. As an example and not by way of limitation, touch sensor 10 may configure one integration period to have a positive measurement polarity and the next integration period to have a negative measurement polarity. The two integrated signals may then be combined, and based on the value or magnitude of the combined signals, the received data may be interpreted as a bit with value 1 or 0. In particular embodiments, a pulse of stylus transmit signal 330 that results in a positive and negative induced signal 310 at stylus may be interpreted as a bit value 1. A bit value of 0 may result from no pulse being applied in stylus transmit signal 330. In the example of FIG. 11, stylus transmit signal 330 may represent the digital signal 1 0 1 1. Each 1 value induces a positive and negative pulse in signal 310, while the 0 value induces little or no pulse in signal 310.

In particular embodiments, stylus transmit signal 330 may transmit information using any suitable modulation scheme, such as for example on-off keying (OOK), amplitude-shift keying (ASK), phase-shift keying (PSK), differential PSK (DPSK), or frequency-shift keying (FSK). In particular embodiments, information transmitted by stylus 20 for reception by device 52 may include button status information (e.g., button 30 is pressed or not pressed); force or pressure information (e.g., amount of force or pressure applied to tip 26); status of stylus battery (e.g., stylus battery needs to be recharged); eraser information (e.g., configure a part of stylus 20 to act as an eraser); color information (e.g., configure tip 26 of stylus 20 to act as a pen with a particular color); or any other suitable information. Although this disclosure describes and illustrates particular stylus signals having particular modulation schemes and configured to transmit particular information, this disclosure contemplates any suitable stylus signals having any suitable modulation schemes and configured to transmit any suitable information.

In particular embodiments, stylus 20 and device 52 may be separated by a particular distance (e.g., less than 10 mm, 25 mm, 50 mm, 100 mm, 200 mm, or less than any suitable separation distance), and synchronization signal 100 or stylus information signal 330 may be configured to propagate over the separation distance. As an example and not by way of limitation, stylus 20 and device 52 may be separated by approximately 80 mm, and synchronization signal 100 and stylus information signal 330 may each have sufficient amplitude, energy, or power to be transmitted over the 80-mm separation distance from one device to the other. In particular embodiments, synchronization signal 100 or stylus information signal 330 may be configured to propagate over no more than a separation distance between stylus 20 and device 52. Although this disclosure describes and illustrates particular devices transmitting or receiving particular signals over particular separation distances, this disclosure contemplates any suitable devices transmitting or receiving any suitable signals over any suitable separation distances.

In particular embodiments, during a data phase when stylus 20 may be transmitting stylus transmit signal 330, device 52 may determine that stylus transmit signal 330 is not being received as a valid signal. As an example and not by way of limitation, stylus 20 and device 52 may have drifted out of phase with respect to one another so that stylus transmit signal 330 is not aligned with touch controller integration windows 300. As another example and not by way of limitation, stylus 20 and device 52 may have moved apart physically, and the separation distance between stylus 20 and device 52 may have exceeded a transmission distance of stylus transmit signal 330. In particular embodiments, if device 52 determines that it is not receiving a valid signal, device 52 may switch to the synchronization phase and broadcast synchronization signal 100. In particular embodiments, device 52 may determine that received signal 310 has an excessive amount of noise. As an example and not by way of limitation there may be other sources of electromagnetic radiation nearby that are interfering with stylus transmit signal 330. In particular embodiments, if device 52 determines that there is excess electrical noise present on received signal 310, device 52 may switch to the synchronization phase and broadcast synchronization signal 100. In particular embodiments, device 52 may change the frequency of synchronization signal 100 to avoid the electrical noise that was detected at the previous frequency.

In particular embodiments, stylus transmit signal 330 may include 2, 4, 8, 16, 32, 64, or any suitable number of bits. In particular embodiments, after transmitting signal 330, stylus 20 may return to the synchronization phase and listen for synchronization signal 100. As an example and not by way of limitation, device 52 may not have successfully received the previously sent signal 330, and device 52 may return to the synchronization phase. If stylus 20 detects a synchronization signal 100 within a certain period of time, stylus 20 may perform the synchronization routine to determine a synchronization parameter, and then stylus 20 may re-send the previously sent signal 330. In particular embodiments, stylus 20 may include a previously determined synchronization parameter in its determination of a new or updated synchronization parameter. After transmitting signal 330, if stylus 20 does not detect a synchronization signal 100 within a certain period of time, stylus 20 may enter an idle or sleep state.

Figure 12:
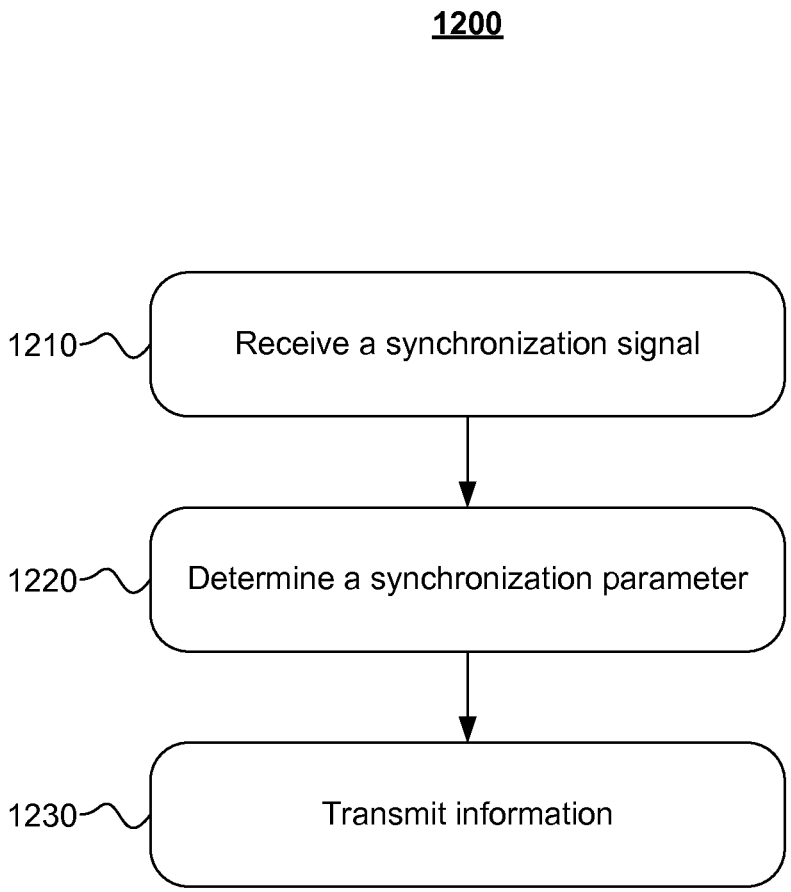
FIG. 12 illustrates an example method for transmitting information.

FIG. 12 illustrates example method 1200 for transmitting information. In particular embodiments, method 1200 illustrated in FIG. 12 may be performed by stylus 20, where stylus 20 includes a clock having a clock period. In particular embodiments, method 1200 may be performed by stylus 20 to receive synchronization signal 100 from device 52 and to transmit information to device 52. The method may start at step 1210 where a synchronization signal may be received. In particular embodiments, stylus 20 may receive synchronization signal 100 from a touch controller of a second device (e.g., device 52). In particular embodiments, synchronization signal 100 may be wirelessly received by stylus 20 from device 52, where synchronization signal 100 is transmitted by touch sensor 10 of device 52. At step 1220, a synchronization parameter may be determined. In particular embodiments, based on the received synchronization signal 100, stylus 20 may determine a synchronization parameter that includes an integer part and a fractional part. In particular embodiments, the synchronization parameter may reflect a relationship between synchronization-signal period 110 and the stylus clock period. In particular embodiments, the integer part may represent a positive integer multiple of stylus clock periods, and the fractional part may represent a fractional portion of stylus clock periods. At step 1230, information may be transmitted. In particular embodiments, the information may be transmitted for reception by a touch controller of a second computing device (e.g., device 52). In particular embodiments, the transmitted information may include a series of data portions, each successive data portion in the series being separated from a preceding data portion by a time interval, the time interval based on the synchronization parameter. In particular embodiments, the time interval may be based at least in part on the stylus clock period, the integer part of the synchronization parameter, and the fractional part of the synchronization parameter. In particular embodiments, the time interval may be based at least in part on the active-stylus clock period, the integer part of the synchronization parameter, and an updated fractional error value, where the updated fractional error value equals a current fractional error value plus the fractional part of the synchronization parameter. Particular embodiments may repeat one or more steps of method 1200 of FIG. 12, where appropriate. Moreover, although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for transmitting information, this disclosure contemplates any suitable method for ransmitting information, including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method performed by an active stylus, the method comprising:

wirelessly receiving a synchronization signal from a touch controller;

determining a synchronization parameter of the synchronization signal, the synchronization parameter comprising an integer part and a fractional part, the integer part representing a positive integer multiple of an active-stylus clock period and the fractional part representing a fractional portion of the active-stylus clock period; and wirelessly transmitting information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.

2. The method of claim 1, wherein:

the touch controller is part of a personal computing device, the personal computing device comprising a touch sensor; and the active stylus comprises one or more electrodes for wirelessly transmitting signals to or receiving signals from the personal computing device through the touch sensor.

3. The method of claim 1, wherein:

the synchronization signal is a two-level digital signal having a duty cycle of approximately 50% and comprising rising and falling edges; and a synchronization-signal period of the synchronization signal is approximately equal to a duration of one cycle of the synchronization signal, wherein the duration of one cycle of the synchronization signal equals a time between consecutive rising edges or consecutive falling edges.

4. The method of claim 3, wherein the synchronization parameter corresponds to a duration of time approximately equal to one-half of the synchronization-signal period.

5. The method of claim 1, wherein:

the synchronization signal has a synchronization-signal period between 1 and 10 microseconds;

the synchronization signal has a frequency between 100 kHz and 1 MHz;

the active-stylus clock period corresponds to a period of an active-stylus clock and is between 40 and 340 nanoseconds; and the active-stylus clock has a clock frequency between 3 and 25 MHz.

6. The method of claim 1, wherein:

the active-stylus clock period is approximately equal to a duration of one cycle of a clock of the active stylus; and the fractional portion of the active-stylus clock period represents a duration of time greater than or equal to zero active-stylus clock periods and less than one active-stylus clock period.

7. The method of claim 1, wherein determining the synchronization parameter comprises:

counting a number of active-stylus clock cycles until a particular quantity of edges of the synchronization signal is accumulated;

dividing the number of counted active-stylus clock cycles by the particular quantity of edges to determine a decimal number, the decimal number comprising an integer part and a fractional part; and assigning the integer part of the decimal number to the integer part of the synchronization parameter and the fractional part of the decimal number to the fractional part of the synchronization parameter.

8. The method of claim 7, wherein the edges are rising edges, falling edges, or rising and falling edges.

9. The method of claim 7, wherein:

the particular quantity of edges equals $2^n$, wherein n is a positive integer; and the dividing the number of counted clock cycles by the particular quantity of edges comprises applying a right shift by n digits to bits representing the number of counted clock cycles.

10. The method of claim 1, wherein the time interval equals the positive integer multiple of the active-stylus clock period or the positive integer multiple of the active-stylus clock period plus one active-stylus clock period.

11. The method of claim 1, wherein transmitting information for reception by the [second computing device] *touch controller* comprises:

prior to transmitting each successive data portion, determining the time interval by which the successive data portion is separated from the preceding data portion, wherein determining the time interval comprises:

determining the updated fractional error value; and if the updated fractional error value is less than one, then setting the time interval to be the positive integer multiple of the active-stylus clock period, else:

setting the time interval to be the positive integer multiple of the active-stylus clock period plus one active-stylus clock period; and decrementing the updated fractional error value by one.

12. The method of claim 1, further comprising determining a phase of the synchronization signal, wherein a first data portion of the series of data portions is transmitted at a time based on the determined phase.

13. The method of claim 1, further comprising:

separating the active stylus and the touch controller by a distance of 100 millimeters or less; and wirelessly propagating the synchronization signal and the information over the distance between the active stylus and the touch controller.

14. An active stylus comprising: one or more processors; and a memory coupled to the processors comprising instructions executable by the processors, the processors operable when executing the instructions to:

wirelessly receive a synchronization signal from a touch controller;

determine a synchronization parameter of the synchronization signal, the synchronization parameter comprising an integer part and a fractional part, the integer part representing a positive integer multiple of an active-stylus clock period and the fractional part representing a fractional portion of the active-stylus clock period; and wirelessly transmit information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.

15. The active stylus of claim 14, wherein:

the touch controller is part of a personal computing device, the personal computing device comprising a touch sensor; and the active stylus further comprises one or more electrodes for wirelessly transmitting signals to or receiving signals from the personal computing device through the touch sensor.

16. The active stylus of claim 14, wherein:

the synchronization signal is a two-level digital signal having a duty cycle of approximately 50% and comprising rising and falling edges; and a synchronization-signal period of the synchronization signal is approximately equal to a duration of one cycle of the synchronization signal, wherein the duration of one cycle of the synchronization signal equals a time between consecutive rising edges or consecutive falling edges.

17. The active stylus of claim 16, wherein the synchronization parameter corresponds to a duration of time approximately equal to one-half of the synchronization-signal period.

18. The active stylus of claim 14, wherein:

the synchronization signal has a synchronization-signal period between 1 and 10 microseconds;

the synchronization signal has a frequency between 100 kHz and 1 MHz;

the active-stylus clock period corresponds to a period of an active-stylus clock and is between 40 and 340 nanoseconds; and the active-stylus clock has a clock frequency between 3 and 25 MHz.

19. The active stylus of claim 14, wherein:

the active-stylus clock period is approximately equal to a duration of one cycle of a clock of the active stylus; and the fractional portion of the active-stylus clock period represents a duration of time greater than or equal to zero active-stylus clock periods and less than one active-stylus clock period.

20. One or more computer-readable non-transitory storage medium embodying software that is operable when executed to:

wirelessly receive a synchronization signal from a touch controller;

determine a synchronization parameter of the synchronization signal, the synchronization parameter comprising an integer part and a fractional part, the integer part representing a positive integer multiple of an active-stylus clock period and the fractional part representing a fractional portion of the active-stylus clock period; and wirelessly transmit information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.

*21. A method performed by an active stylus, the method comprising:*

*determining a synchronization parameter for communication with a touch controller, the synchronization parameter indicative of a decimal number corresponding to an active-stylus clock count divided by a defined value and comprising an integer part and a fractional part, the integer part representing a positive integer multiple of an active-stylus clock period and the fractional part representing a fractional portion of the active-stylus clock period; and*

*wirelessly transmitting information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.*

*22. The method of claim 21, wherein:*

*the touch controller is part of a personal computing device, the personal computing device comprising a touch sensor; and*

*the active stylus comprises one or more electrodes for wirelessly transmitting signals to or receiving signals from the personal computing device through the touch sensor.*

*23. The method of claim 21, wherein:*

*the active-stylus clock period is approximately equal to a duration of one cycle of a clock of the active stylus; and*

*the fractional portion of the active-stylus clock period represents a duration of time greater than or equal to zero active-stylus clock periods and less than one active-stylus clock period.*

*24. The method of claim 21, wherein the defined value corresponds to a defined number of edges of a signal used by the active stylus.*

*25. The method of claim 21, wherein the time interval equals the positive integer multiple of the active-stylus clock period or the positive integer multiple of the active-stylus clock period plus one active-stylus clock period.*

*26. The method of claim 21, wherein transmitting information for reception by the touch controller comprises:*

*prior to transmitting each successive data portion, determining the time interval by which the successive data portion is separated from the preceding data portion, wherein determining the time interval comprises:*

*determining the updated fractional error value; and*

*if the updated fractional error value is less than one, then setting the time interval to be the positive integer multiple of the active-stylus clock period, else:*

*setting the time interval to be the positive integer multiple of the active-stylus clock period plus one active-stylus clock period; and*

*decrementing the updated fractional error value by one.*

*27. An active stylus comprising: one or more processors; and a memory coupled to the processors comprising instructions executable by the processors, the processors operable when executing the instructions to:*

*determine a synchronization parameter for communication with a touch controller, the synchronization parameter indicative of a decimal number corresponding to an active-stylus clock count divided by a defined value and comprising an integer part and a fractional*

*part, the integer part representing a positive integer multiple of an active-stylus clock period and the fractional part representing a fractional portion of the active-stylus clock period; and*

*wirelessly transmit information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.*

*28. The active stylus of claim 27, wherein:*

*the touch controller is part of a personal computing device, the personal computing device comprising a touch sensor; and*

*the active stylus further comprises one or more electrodes for wirelessly transmitting signals to or receiving signals from the personal computing device through the touch sensor.*

*29. The active stylus of claim 27, wherein:*

*the active-stylus clock period is approximately equal to a duration of one cycle of a clock of the active stylus; and*

*the fractional portion of the active-stylus clock period represents a duration of time greater than or equal to zero active-stylus clock periods and less than one active-stylus clock period.*

*30. One or more computer-readable non-transitory storage medium embodying software that is operable when executed to:*

*determine a synchronization parameter for communication with a touch controller, the synchronization parameter indicative of a decimal number corresponding to an active-stylus clock count divided by a defined value and comprising an integer part and a fractional part, the integer part representing a positive integer multiple of an active-stylus clock period and the fractional part representing a fractional portion of the active-stylus clock period; and*

*wirelessly transmit information for reception by the touch controller, wherein the information comprises a series of data portions, a successive data portion in the series being separated from a preceding data portion by a time interval, wherein the time interval is based at least in part on the active-stylus clock period, the integer part of the synchronization parameter, and an updated fractional error value, wherein the updated fractional error value equals a current fractional error value plus the fractional part of the synchronization parameter.*

* * * * *